US012518926B2

(12) United States Patent
Kitahara et al.

(10) Patent No.: US 12,518,926 B2
(45) Date of Patent: *Jan. 6, 2026

(54) MULTILAYER CERAMIC CAPACITOR INCLUDING EXTERNAL ELECTRODES WITH DIFFERENT THICKNESSES

(71) Applicant: Murata Manufacturing Co., Ltd., Nagaokakyo (JP)

(72) Inventors: Keita Kitahara, Nagaokakyo (JP); Riyousuke Akazawa, Nagaokakyo (JP); Takefumi Takahashi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 188 days.

This patent is subject to a terminal disclaimer.

(21) Appl. No.: 18/081,740

(22) Filed: Dec. 15, 2022

(65) Prior Publication Data

US 2023/0197345 A1   Jun. 22, 2023

(30) Foreign Application Priority Data

Dec. 22, 2021 (JP) .................. 2021-208467

(51) Int. Cl.
*H01G 4/232* (2006.01)
*H01G 4/30* (2006.01)

(52) U.S. Cl.
CPC .......... *H01G 4/2325* (2013.01); *H01G 4/30* (2013.01)

(58) Field of Classification Search
CPC .......... H01G 4/2325; H01G 4/30; H01G 4/12; H01G 4/012
See application file for complete search history.

(56) References Cited

U.S. PATENT DOCUMENTS 10,825,611 B1    11/2020 Fukuoka et al.
2011/0085280 A1*  4/2011 Muto ............... H01B 3/12
                                                501/137

(Continued)

FOREIGN PATENT DOCUMENTS

CN    106024381 A    10/2016
JP    2021-019010 A   2/2021

OTHER PUBLICATIONS

Official Communication issued in corresponding Chinese Patent Application No. 202211646352.5, mailed on Jun. 17, 2025, 6 pages.

*Primary Examiner* — Timothy J. Dole
*Assistant Examiner* — Daniel M Dubuisson
(74) *Attorney, Agent, or Firm* — Keating & Bennett, LLP

(57) ABSTRACT

A multilayer ceramic capacitor includes a multilayer body including internal electrode layers and internal dielectric layers alternately laminated therein, main surfaces on both sides in a lamination direction, end surfaces on both sides in a length direction intersecting the lamination direction, and lateral surfaces on both sides in a width direction intersecting the lamination direction and the length direction, and two external electrodes on the end surfaces of the multilayer body. The two external electrodes each include a central portion having a thickness L1, and located at a center or approximate center in the lamination direction and at a center or approximate center in the width direction, and an outer peripheral portion surrounding the central portion and having a thickness L2, where a relationship therebetween is L1<L2.

20 Claims, 7 Drawing Sheets

(56) References Cited

U.S. PATENT DOCUMENTS

| | | | | |
|---|---|---|---|---|
| 2012/0019099 A1* | 1/2012 | Sato | H01G 4/012 | 361/321.1 |
| 2013/0063862 A1* | 3/2013 | Kim | H01G 4/30 | 156/182 |
| 2014/0002949 A1* | 1/2014 | Gu | H01G 4/12 | 361/301.4 |
| 2014/0209363 A1* | 7/2014 | Oh | H01G 4/12 | 361/301.4 |
| 2014/0254064 A1* | 9/2014 | Miyazaki | H01G 4/2325 | 427/535 |
| 2016/0225525 A1* | 8/2016 | Mizuno | H01G 4/30 | |
| 2016/0293332 A1 | 10/2016 | Kato et al. | | |
| 2016/0351332 A1* | 12/2016 | Lee | H01G 4/232 | |
| 2017/0092423 A1* | 3/2017 | Iwama | H01G 4/30 | |
| 2018/0033556 A1* | 2/2018 | Itamochi | H01C 7/003 | |
| 2018/0174753 A1* | 6/2018 | Terashita | H01G 4/008 | |
| 2019/0318872 A1* | 10/2019 | Mizuno | H01G 4/012 | |
| 2019/0318874 A1* | 10/2019 | Orimo | H05K 1/181 | |
| 2020/0029438 A1* | 1/2020 | Sasaki | H01G 4/30 | |
| 2020/0082983 A1* | 3/2020 | Kim | H01G 4/012 | |
| 2020/0234879 A1* | 7/2020 | Aida | H01G 4/30 | |
| 2020/0312562 A1* | 10/2020 | Nishibayashi | H01G 4/2325 | |
| 2020/0357574 A1* | 11/2020 | Tanaka | B32B 38/04 | |
| 2021/0335542 A1* | 10/2021 | Matsushita | H01G 2/065 | |
| 2022/0076888 A1* | 3/2022 | Kim | H01G 4/30 | |
| 2023/0187138 A1* | 6/2023 | Park | H01G 4/012 | 361/301.4 |
| 2023/0197339 A1* | 6/2023 | Kitahara | H01G 4/2325 | 361/301.4 |
| 2023/0197346 A1* | 6/2023 | Kitahara | H01G 4/2325 | 361/301.4 |
| 2023/0197350 A1* | 6/2023 | Kitahara | H01G 4/30 | 361/301.4 |

\* cited by examiner

MULTILAYER CERAMIC CAPACITOR INCLUDING EXTERNAL ELECTRODES WITH DIFFERENT THICKNESSES

CROSS REFERENCE TO RELATED APPLICATIONS

This application claims the benefit of priority to Japanese Patent Application No. 2021-208467 filed on Dec. 22, 2021. The entire contents of this application are hereby incorporated herein by reference.

BACKGROUND OF THE INVENTION

1. Field of the Invention

The present invention relates to a multilayer ceramic capacitor.

2. Description of the Related Art

Multilayer ceramic capacitors each include a multilayer body including internal electrode layers and dielectric layers laminated therein, and external electrodes provided on end surfaces of the multilayer body. The external electrodes each include a base electrode layer and a plated layer. The base electrode layer is formed by applying a paste including Cu and glass, and firing the paste. Then, the multilayer body to which the base electrode layer is fired is subjected to barrel processing (see, for example, Japanese Unexamined Patent Application Publication No. 2021-019010).

However, when the multilayer body to which the base electrode layer is fired is subjected to barrel processing, the outer peripheral portion of the base electrode layer provided at the end surface is cut, and the end surface of the multilayer body may be exposed. In such a case, a plating solution penetrates into the multilayer body, which may lead to insufficient performance of the multilayer ceramic capacitor.

SUMMARY OF THE INVENTION

Preferred embodiment of the present invention provide multilayer ceramic capacitors that each ensure sufficient performance.

A preferred embodiment of the present invention provides a multilayer ceramic capacitor including a multilayer body including a plurality of internal electrode layers and a plurality of internal dielectric layers alternately laminated therein, main surfaces on both sides in a lamination direction, end surfaces on both sides in a length direction intersecting the lamination direction, and lateral surfaces on both sides in a width direction intersecting the lamination direction and the length direction, and two external electrodes on the end surfaces of the multilayer body, wherein the two external electrodes each include a central portion having a thickness L1, the central portion being located at a center or approximate center in the lamination direction and at a center or approximate center in the width direction, and an outer peripheral portion surrounding the central portion and having a thickness L2, where a relationship therebetween is L1<L2.

According to preferred embodiments of the present invention, it is possible to provide multilayer ceramic capacitors that each ensure sufficient performance.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
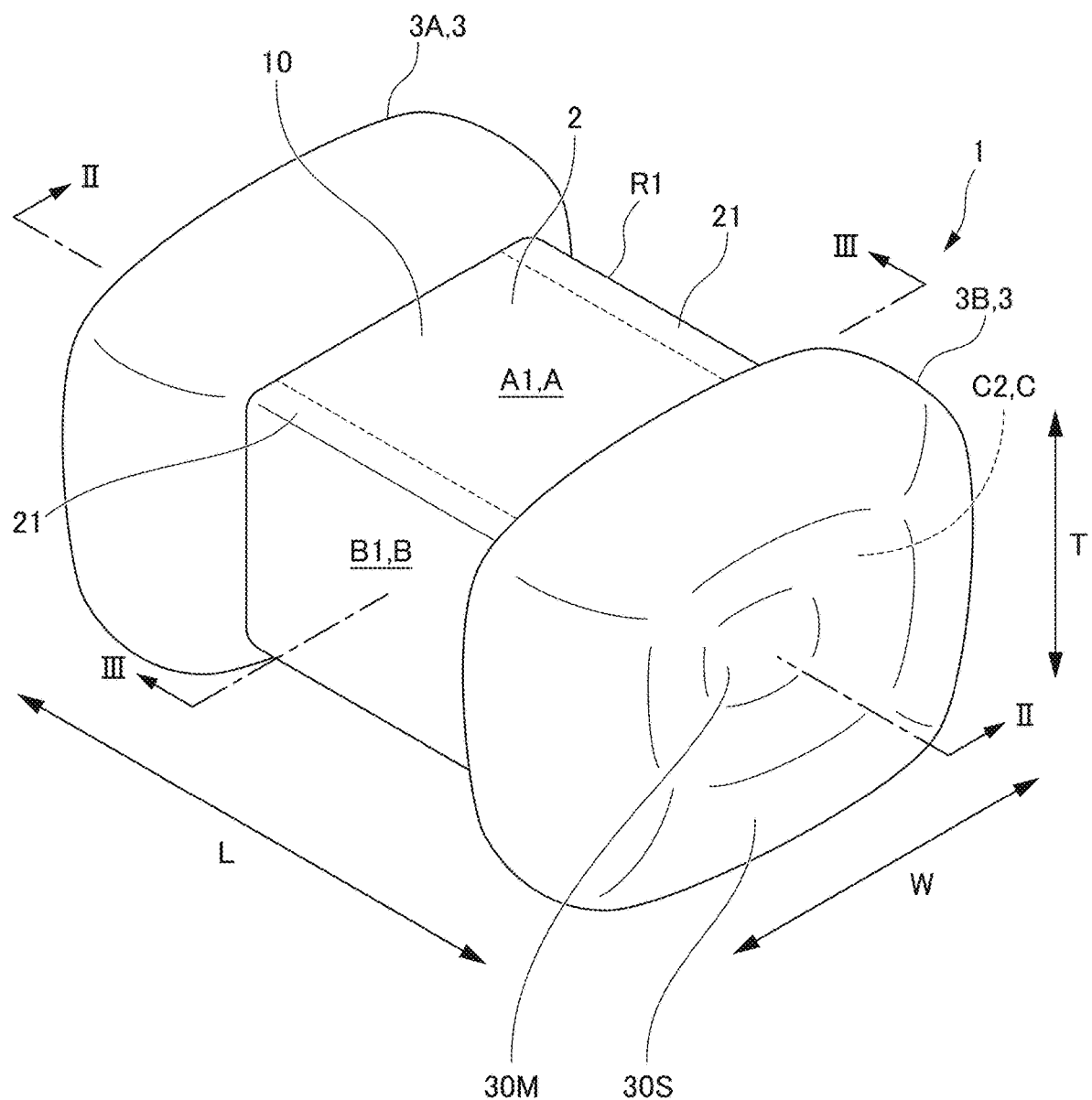
FIG. 1 is a schematic perspective view of a multilayer ceramic capacitor 1 according to a preferred embodiment of the present invention.

Preferred embodiments of the present invention will be described in detail below with reference to the drawings.

Multilayer Ceramic Capacitor 1

Hereinafter, a multilayer ceramic capacitor 1 according to a preferred embodiment of the present invention will be described. The multilayer ceramic capacitor 1 has a rectangular or substantially rectangular parallelepiped shape, and includes a multilayer body 2 and a pair of external electrodes 3 provided at both ends of the multilayer body 2. The multilayer body 2 includes an inner layer portion 11 including internal dielectric layers 14 and internal electrode layers 15 laminated therein.

The dimensions of the multilayer ceramic capacitor 1 are, for example, about 0.1 mm or more and about 0.5 mm or less in the width direction W, about 0.1 mm or more and about 0.6 mm or less in the thickness direction, and about 0.3 mm or more and about 1.0 or less in the length direction L.

In the following description, as a term indicating the orientation of the multilayer ceramic capacitor 1, a direction in which the pair of external electrodes 3 is provided in the multilayer ceramic capacitor 1 is referred to as a length direction L. A direction in which the internal dielectric layers 14 and the internal electrode layers 15 are laminated (stacked) is referred to as a lamination (stacking) direction T. A direction intersecting both the length direction L and the lamination direction T is referred to as a width direction W. In a preferred embodiment of the present invention, the width direction W is orthogonal or substantially orthogonal to both the length direction L and the lamination direction T. In the multilayer ceramic capacitor 1 of the preferred embodiment, the length direction L is longer than the width direction W and the lamination direction T. However, the present invention is not limited thereto, and the dimension in the length direction L may not be longer than the width direction W or the lamination direction T.

In the following description, among the six outer surfaces of the multilayer body 2, a pair of outer surfaces opposed to each other in the lamination direction T are referred to as a first main surface A1 and a second main surface A2, a pair of outer surfaces opposed to each other in the width direction W are referred to as a first lateral surface B1 and a second lateral surface B2, and a pair of outer surfaces opposed to each other in the length direction L are referred to as a first end surface C1 and a second end surface C2. The first main surface A1 and the second main surface A2 are collectively referred to as a main surface A when it is not necessary to be particularly distinguished from each other, the first lateral surface B1 and the second lateral surface B2 are collectively referred to as a lateral surface B when it is not necessary to be particularly distinguished from each other, and the first end surface C1 and the second end surface C2 are collectively referred to as an end surface C when it is not necessary to be particularly distinguished from each other.

Multilayer Body 2

The multilayer body 2 includes a multilayer body chip 10 and side margin portions 21 provided on both sides of the multilayer body chip 10 in the width direction W. The multilayer body chip 10 includes the inner layer portion 11 in which the internal dielectric layers 14 and the internal electrode layers 15 are laminated, and two outer layer portions 22 provided on both sides of the inner layer portion 11 in the lamination direction T.

Although the multilayer body 2 has a rectangular or substantially rectangular parallelepiped shape, a certain region including a ridge portion R1 is rounded to provide a curved surface. The ridge portion R1 refers to a portion between two surfaces of the multilayer body 2, that is, the main surface A and the lateral surface B, the main surface A and the end surface C, or the lateral surface B and the end surface C, and includes a corner portion between the main surface A, the lateral surface B, and the end surface C.

Inner Layer Portion 11

The inner layer portion 11 refers to a portion in which the internal dielectric layers 14 and the internal electrode layers 15 are alternately laminated along the lamination direction T.

Internal Electrode Layer 15

The internal electrode layers 15 include a plurality of first internal electrode layers 15A and a plurality of second internal electrode layers 15B. The first internal electrode layers 15A and the second internal electrode layers 15B are alternately provided. The first internal electrode layer 15A and the second internal electrode layer 15B are collectively described as the internal electrode layer 15 when it is not necessary to distinguish them from each other.

The internal electrode layer 15 includes, for example, Ni (nickel) as a main component. The internal electrode layer 15 may further include dielectric particles having the same composition as the ceramics included in the internal dielectric layer 14.

The first internal electrode layer 15A includes a first counter portion 15Aa opposed to the second internal electrode layer 15B, and a first extension portion 15Ab that extends from the first counter portion 15Aa toward the first end surface C1 and is exposed at the first end surface C1. An end portion of the first extension portion 15Ab is exposed at the first end surface C1, and is electrically connected to a first external electrode 3A described later.

The second internal electrode layer 15B includes a second counter portion 15Ba opposed to the first internal electrode layer 15A, and a second extension portion (not shown) that extends from the second counter portion 15Ba toward the second end surface C2 and is exposed at the second end surface C2. An end portion of the second extension portion is electrically connected to a second external electrode 3B described later. In the internal electrode layer 15, charges are accumulated between the first counter portion 15Aa of the first internal electrode layer 15A and the second counter portion 15Ba of the second internal electrode layer 15B with the internal dielectric layer 14 interposed therebetween, such that the internal electrode layer 15 defines and functions as a capacitor.

Figure 3:
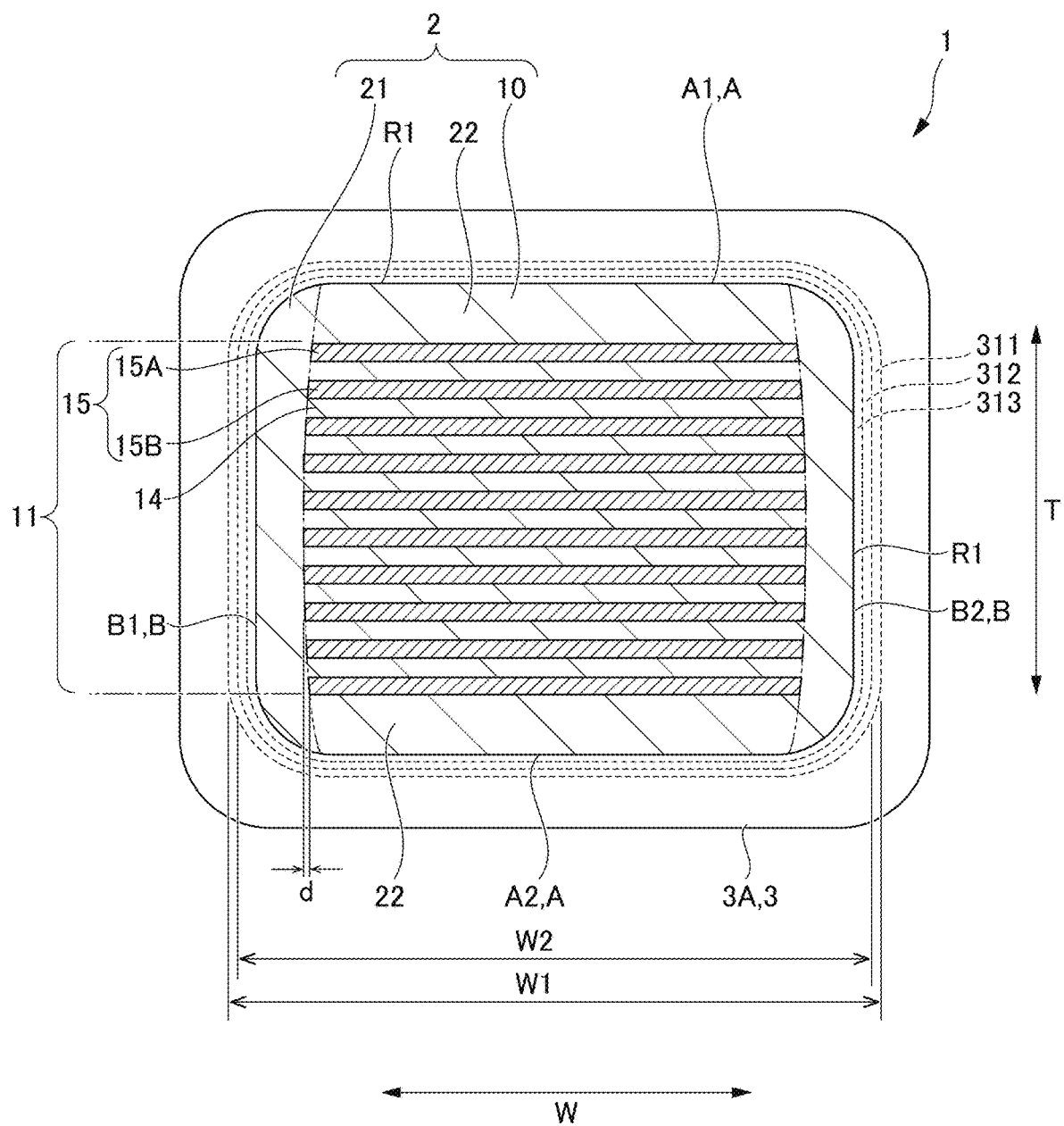
FIG. 3 is a cross-sectional view of the multilayer ceramic capacitor 1 taken along the line III-III of FIG. 1.

As shown in FIG. 3, in a cross section WT, which is a cross section in the width direction W and the lamination direction T passing through the center or approximate center of the multilayer body 2, the positional displacement d between the end portions in the width direction W of the first internal electrode layer 15A and the second internal electrode layer 15B, which are adjacent vertically in the lamination direction T, is preferably about 5 μm or less, and more preferably about 0.5 μm or less, for example. In other words, the end portions in the width direction W of the first internal electrode layer 15A and the second internal electrode layer 15B, which are adjacent vertically to each other in the lamination direction T, are located at the same or substantially the same position in the width direction W, and the positions of the end portions are aligned in the lamination direction T.

The number of internal electrode layers 15 is preferably, for example, 10 or more and 1000 or less. The thickness of each of the internal electrode layers 15 is preferably about 0.3 μm or more and about 0.4 μm or less, and more preferably about 0.3 μm or more and about 0.35 μm or less, for example.

The thickness of the internal electrode layer 15 is measured, for example, as follows. First, the LT cross section passing through the center of the multilayer ceramic capacitor 1 is polished to expose the inner layer portion 11. If necessary, the exposed cross-section at the observation position is etched to remove the conductor layer stretched by polishing.

Figure 4:
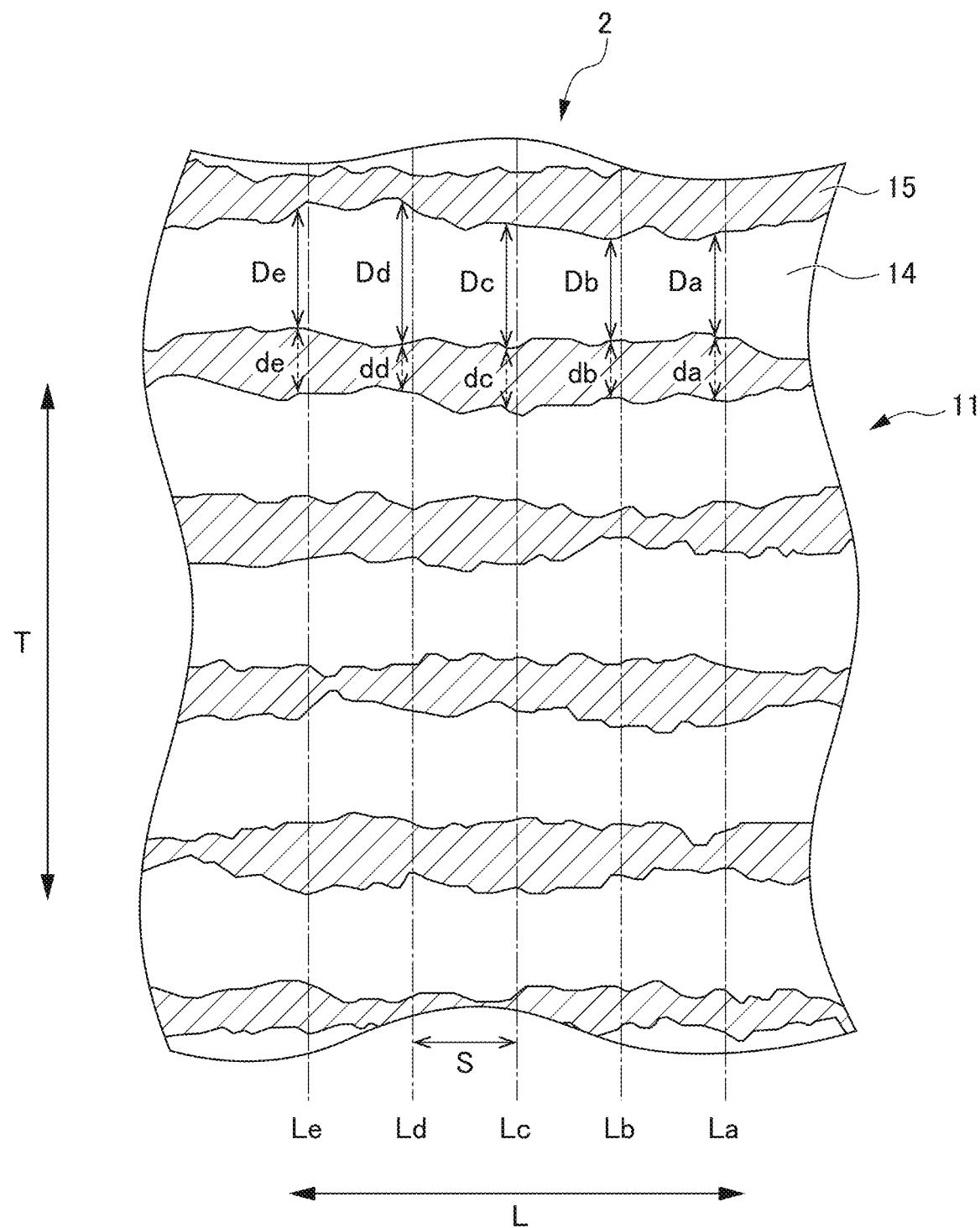
FIG. 4 is an exemplary enlarged image of a cross section of an exposed inner layer portion 11.

FIG. 4 is an exemplary enlarged image of a cross section of the exposed inner layer portion 11. For example, in the enlarged image shown in the drawings, a plurality of straight lines La, Lb, Lc, Ld, and Le extending in the lamination direction T are drawn at equal or substantially equal intervals at a pitch S. The pitch S is preferably, for example, about 5 to about 10 times the thickness of the internal electrode layer 15 to be measured. For example, in a case where an internal electrode layer 15 having a thickness of about 1 μm is measured, the pitch S is set to be about 5 μm.

Next, the thicknesses da, db, dc, dd, and de of the respective internal electrode layers 15 are measured on the respective straight lines of the five straight lines La, Lb, Lc, Ld, and Le. However, when the internal electrode layer 15 is missing on the straight lines La, Lb, Lc, Ld, and Le and the internal dielectric layers 14 sandwiching the internal electrode layer 15 are connected to each other, or when the enlarged view of the measurement position is unclear, a new straight line is drawn and the thickness of the internal electrode layer 15 is measured, for example.

In a case of the five or more internal electrode layers 15, for example, the thicknesses of the internal electrode layers 15 of about five layers are measured by the above-described method, and when the number of stacked internal electrode layers 15 is less than five, the thicknesses of all the internal electrode layers 15 are measured by the above-described method, and the average value thereof is set as the average thickness of the plurality of internal electrode layers 15.

Internal Dielectric Layer 14

The internal dielectric layer 14 is, for example, a dielectric ceramic including Ba and Ti components, and includes Si. Furthermore, a component having a content lower than that of a main component such as, for example, a Mn compound, an Fe compound, a Cr compound, a Co compound, or a Ni compound may be added to these components.

The total number of the internal dielectric layers 14 and the outer layer portions 22 is preferably, for example, 100 or more and 2000 or less.

The thickness of the internal dielectric layer 14 is preferably about 0.4 µm or more and about 0.5 µm or less, and more preferably about 0.4 µm or more and about 0.45 µm or less, for example. As described above, similarly to the internal electrode layers 15, the thicknesses of the internal dielectric layers 14 can also be obtained by measuring the thicknesses Da, Db, Dc, Dd, and De of the internal dielectric layers 14 on the respective straight lines of the five straight lines La, Lb, Lc, Ld, and averaging them.

Outer Layer Portion 22

The outer layer portions 22 are dielectric layers located adjacent to the respective main surfaces A of the multilayer body 2.

Side Margin Portion 21

The side margin portions 21 are provided on the respective lateral surfaces B of the multilayer body chip 10. In other words, the side margin portions 21 are provided adjacent to both lateral surfaces B of the outer layer portions 22 and the inner layer portion 11, and cover the lateral surfaces B of the outer layer portions 22 and the inner layer portion 11. An area having a certain width adjacent to the lateral surface B of the multilayer body chip 10 refers to the side margin portion 21.

The side margin portion 21 of the present preferred embodiment includes a single-layer structure. However, this is not limitative, and may include two or more layers. When the side margin portion 21 includes a plurality of layers, it can be confirmed by the dark field of the optical microscope that the side margin portion 21 includes a plurality of layers, and it can also be discriminated with an additive or the like which segregates between the layers that the side margin portion 21 includes a plurality of layers.

The thickness of the side margin portion 21 is preferably about 5 µm or more and about 20 µm or less, for example. That is, the distance from the end portion of the internal electrode layer 15 in the width direction W to the lateral surface B of the multilayer body is preferably about 5 µm or more and about 20 µm or less, for example.

External Electrodes 3

The external electrodes 3 include a first external electrode 3A provided on the first end surface C1 of the multilayer body 2 and a second external electrode 3B provided on the second end surface C2 of the multilayer body 2. The first external electrode 3A and the second external electrode 3B are collectively described as the external electrode 3 when it is not necessary to distinguish them from each other.

As described above, the end portion of the first extension portion 15Ab of the first internal electrode layer 15A is exposed at the first end surface C1, and is electrically connected to the first external electrode 3A. Furthermore, the end portion of the second extension portion of the second internal electrode layer 15B is exposed at the second end surface C2, and is electrically connected to the second external electrode 3B. With such a configuration, a plurality of capacitor elements are electrically connected in parallel between the first external electrode 3A and the second external electrode 3B.

The external electrode 3 includes a base electrode layer 31 and a plated layer 32 provided on the base electrode layer 31. The plated layer 32 includes, for example, a Cu (copper) plated layer 321 provided on the base electrode layer 31, a Ni (nickel) plated layer 322 provided on the Cu plated layer 321, and a Sn (tin) plated layer 323 provided on the Ni plated layer 322.

Figure 2:
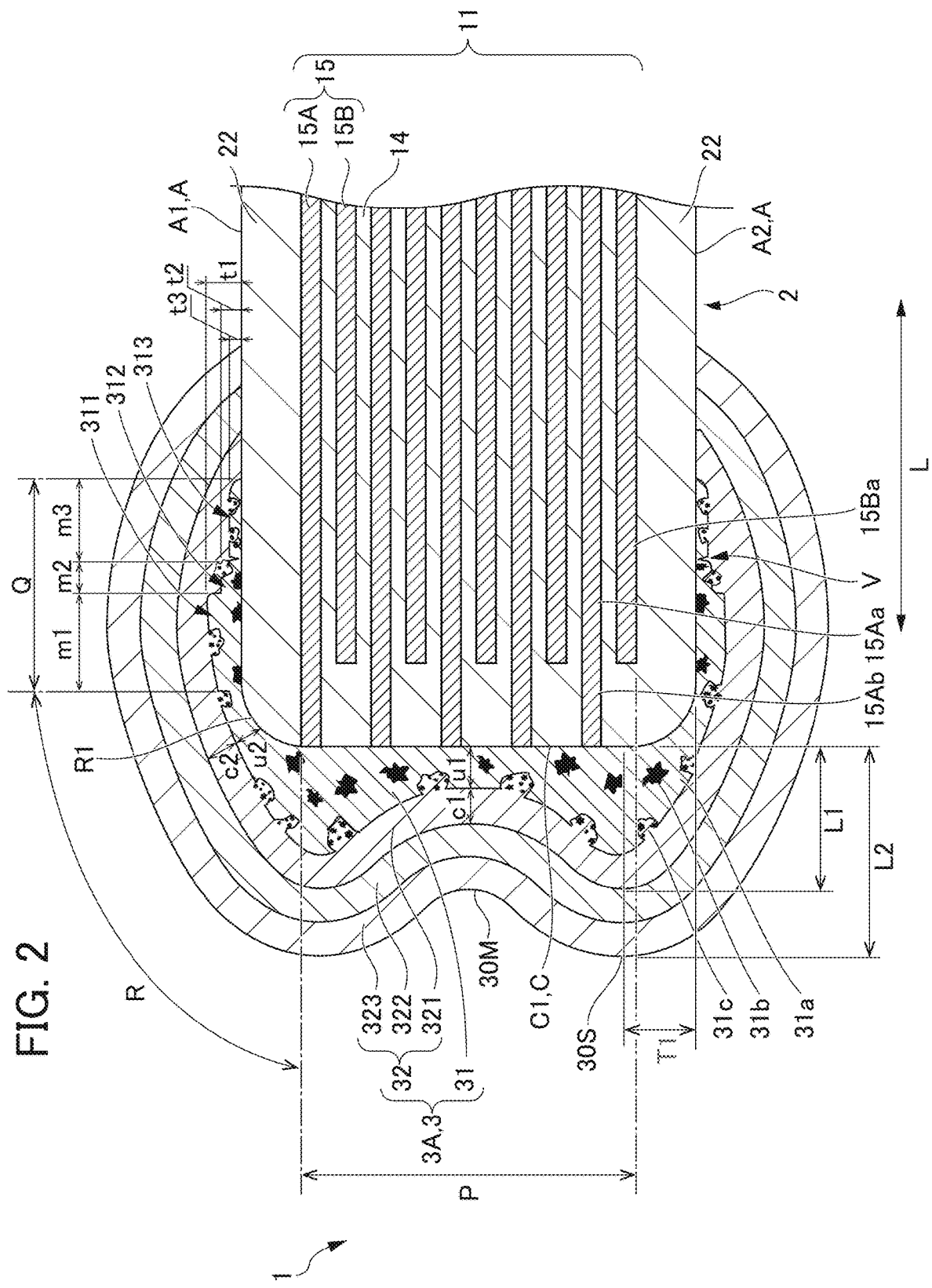
FIG. 2 is a partial cross-sectional view of the multilayer ceramic capacitor 1 taken along the line II-II of FIG. 1.

As shown in FIG. 2, the external electrode 3 covers not only the end surface C, but also portions of the main surface A and the lateral surface B adjacent to the end surface C. More specifically, the external electrode 3 includes the base electrode layer 31 and the plated layer 32 as a whole, and the base electrode layer 31, the Cu plated layer 321, the Ni plated layer 322, and the Sn plated layer 323 which are included in the external electrode 3 include not only an end surface portion P provided on the end surface C, but also an outer peripheral surface portion Q provided on the main surface A and the lateral surface B, and a ridge surface portion R provided between the end surface portion P and the outer peripheral surface portion Q. The ridge surface portion R refers to an outer portion of the rounded curved surface including a ridge portion R1 including the corner between the end surface C and the main surface A and between the end surface C and the lateral surface B in the multilayer body 2.

In the external electrode 3 including the base electrode layer 31 and the plated layer 32 as a whole, and in the base electrode layer 31 alone as well, an outer peripheral portion 30S surrounding a central portion 30M, which is located at the center or approximate center in the lamination direction T as well as the center or approximate center in the width direction W, protrudes outward from the central portion 30M. When the thickness of the central portion 30M is defined as L1 and the thickness of the outer peripheral portion 30S is defined as L2, the relationship of L1<L2 is satisfied. For example, L1 is preferably about 3 µm or more and about 15 µm or less, and L2 is preferably 5 about µm or more and about 20 µm or less.

Central Portion 30M

The central portion 30M of the external electrode 3 as a whole as well as the central portion 30M of the base electrode layer 31 alone are the thinnest portions of the end surface portion P provided on the end surface C. The central portion 30M may include a region including a certain area including the center or approximate center in the lamination direction T as well as the center or approximate center in the width direction W instead of a single-point region.

Outer Peripheral Portion 30S

The outer peripheral portion 30S of the external electrode 3 as a whole as well as the outer peripheral portion 30S of the base electrode layer 31 alone are the thickest portions at the end surface portion P provided at the end surface C. The outer peripheral portion 30S surrounds both sides of the central portion 30M in the lamination direction T and the width direction W in a rectangular or substantially rectangular shape on the inner side of the end surface C from the main surface A in the lamination direction T and from the lateral surface B in the width direction W by a distance T1. The outer peripheral portion 30S includes the highest portion along the ridge line of the protrusion protruding from the central portion 30M in the end surface C. The distance T1 is preferably about 5 µm or more and about 20 µm or less, and more preferably about 15 µm, for example.

Furthermore, as shown in FIG. 2, the outer peripheral portion 30S is provided closer to the center in the lamination direction T than the internal electrode layer 15 closest to the main surface A.

Base Electrode Layer 31

The base electrode layer 31 is a fired electrode obtained by applying and drying a conductive paste, which will be described later, three times, and firing the resulting product in a preferred embodiment of the present invention. Although the base electrode layer 31 is fired simultaneously with the internal electrode layer 15 in a preferred embodiment of the present invention, this is not limitative, and the base electrode layer 31 may be fired after firing the internal electrode layer 15.

As described above, in the base electrode layer 31, the outer peripheral portion 30S surrounding the central portion 30M, which is located at the center or approximate center in the lamination direction T as well as the center or approximate center in the width direction W, protrudes more than the central portion 30M.

The base electrode layer 31 also includes the end surface portion P provided on the end surface C, the outer peripheral surface portion Q provided on the main surface A and the lateral surface B, and the ridge surface portion R provided between the end surface portion P and the outer peripheral surface portion Q.

Furthermore, the portion provided on the outer peripheral surface portion Q of the base electrode layer 31 includes a first portion 311 having a first thickness t1, a second portion 312 having a second thickness t2, and a third portion 313 having a third thickness t3 in this order from the end surface C toward the center in the length direction L, and the relationship of $t1>t2>t3$ is satisfied.

Therefore, steps are respectively provided between the first portion 311 and the second portion 312 and between the second portion 312 and the third portion 313 in a portion provided on the outer peripheral surface portion Q of the base electrode layer 31.

The length of the first portion 311 in the length direction L is defined as m1, the length of the second portion 312 in the length direction L is defined as m2, the length of the third portion 313 in the length direction L is defined as m3, and m2 is shorter than m3 and m1.

That is, the second portion 312 having the shortest length in the length direction L positioned at the center or approximate center of the steps is surrounded by the first portion 311 and the third portion 313 having the longer lengths in the length direction L via the steps.

Furthermore, a length W1 of the first portion 311 in the width direction W of the base electrode layer 31 shown in FIG. 3 is, for example, equal to or greater than about 1.01 times a length W2 of the second portion 312 in the width direction W.

Furthermore, the third portion 313 of the base electrode layer 31 includes the thickness t3 as described above, but also includes a thin region V at a boundary portion with the second portion 312.

The base electrode layer 31 includes a Cu region 31a including Cu as a main component and a glass region 31b including Si as a main component. The glass region 31b includes a Cu-including glass region 31c including Cu.

The Cu-including glass region 31c is present adjacent to the outer surface of the base electrode layer 31, that is, adjacent to the Cu-plated layer 321. The Cu-including glass region 31c is a region in which Cu penetrates into a Si low density glass region having Si density lower than that of the glass region 31b which is present adjacent to the end surface C of the base electrode layer 31.

Detection of the Cu region 31a including Cu as a main component and the glass region 31b including Si as a main component can be performed by EDX analysis (energy dispersive X-ray analysis). A region in which silica (glass) is detected by EDX analysis is defined as a glass region 31b including Si as a main component. In addition, in the region detected as the glass region 31b, a region in which Si is low density and Cu is detected is defined as a Si low density glass region, which is the Cu-including glass region 31c.

The second portion 312 of the portion of the base electrode layer 31 provided on the outer peripheral surface portion Q of the base electrode layer 31 includes the glass region 31b protruding from the surface thereof, and penetrates into the Cu-plated layer 321 (described later) provided outside the base electrode layer 31.

Cu-plated Layer 321

The Cu-plated layer 321 is provided outside the base electrode layer 31 to cover the surface of the base electrode layer 31.

The Cu-plated layer 321 prevents a portion of hydrogen generated in the Ni electrolytic plating process of forming the Ni-plated layer 322 on the Cu-plated layer 321 from penetrating the inside of the multilayer body 2 through the base electrode layer 31 and reaching the internal electrode layer 15. Thus, since it is possible to reduce the amount of hydrogen included in the multilayer ceramic capacitor 1, it is possible to reduce or prevent diffusion of hydrogen into the internal dielectric layer 14, and it is also possible to reduce or prevent degradation of the insulation resistance.

The base electrode layer 31 and the Cu-plated layer 321 include the end surface portion P provided on the end surface C, the outer peripheral surface portion Q provided on the main surface A and the lateral surface B, and the ridge surface portion R provided between the end surface portion P and the outer peripheral surface portion Q.

When the thickness of the central portion 30M of the Cu-plated layer 321 extending along the end surface C is defined as c1, the thickness of the thinnest portion of the ridge surface portion R is defined as c2, the thickness of the central portion 30M of the base electrode layer 31 extending along the end surface C is defined as u1, and the thickness of the thinnest portion of the ridge surface portion R is defined as u2, the relationship of $c1-c2<u1-u2$ is satisfied. The Cu-plated layer 321 gradually becomes thin at the tip of the outer peripheral surface portion Q, but the thicknesses c1 and c2 are constant or substantially constant because the Cu-plated layer 321 has a constant or substantially constant thickness at most of the other portions.

Furthermore, the thickness u2 of the base electrode layer 31 at the ridge surface portion R is smaller than the thickness c2 of the Cu-plated layer 321 at the ridge surface portion R.

The ridge surface portion R of the base electrode layer 31 is polished and thinned in a barrel step described later. When the base electrode layer 31 is thin, moisture resistance deteriorates. However, in a preferred embodiment of the present invention, since the Cu-plated layer 321 adheres to the entire or substantially the entire surface with a uniform or substantially uniform thickness, sealing properties are ensured.

In the base electrode layer 31 located outside the outer peripheral portion 30S having the thickness L2, the thickness rapidly decreases, and the thickness u2 of the thinnest portion of the ridge surface portion R becomes smaller than the thickness c2 of the Cu-plated layer 321. The "thickness" herein refers to the length of a normal line drawn from the inner interface to the outer interface of each layer.

Ni-plated Layer 322

The Ni-plated layer 322 is provided outside the Cu-plated layer 321 to cover the surface of the Cu-plated layer 321.

The thickness of the Ni-plated layer 322 is not particularly limited, but is, for example, about 3 μm to about 5 μm.

The Ni-plated layer 322 prevents the base electrode layer 31 and the Cu-plated layer 321 from being eroded by solder when the multilayer ceramic capacitor 1 is mounted.

Sn-plated Layer 323

The Sn-plated layer 323 is provided outside the Ni-plated layer 322 to cover the surface of the Ni-plated layer 322.

The thickness of the Sn-plated layer 323 is not particularly limited, but is, for example, about 3 μm to about 5 μm.

The Sn-plated layer 323 improves wettability of solder when mounting the multilayer ceramic capacitor, and allows for easy mounting.

The thickness L1 of the central portion 30M and the thickness L2 of the outer peripheral portion 30S in the external electrode 3, the distance T1 from the outer periphery of the end surface C of the outer peripheral portion 30S, the first thickness t1 of the first portion 311, the second thickness t2 of the second portion 312, the third thickness t3 of the third portion 313, the length m3 of the third portion 313, the length m2 of the second portion 312, the length m1 of the first portion 311, the length W1 of the first portion 311, the length W2 of the second portion 312, the thickness u1 of the central portion 30M, the thickness u2 of the ridge surface portion R in the base electrode layer 31, the thickness c1 of the central portion 30M and the thickness c2 of the ridge surface portion R in the Cu-plated layer 321, the thickness of the Ni-plated layer 322, the thickness of the Sn-plated layer 323, and the like can be measured in the same manner as the method of measuring the thickness of the internal electrode layer 15.

That is, they can be measured by polishing the multilayer ceramic capacitor 1 to expose a predetermined cross section, enlarging the cross section with a microscope or the like, measuring the length at a plurality of positions, and calculating an average value.

Furthermore, the step between the first portion 311 and the second portion 312, the step between the second portion 312 and the third portion 313, and the like in the base electrode layer 31 can be detected from the appearance. The glass region protruding in the second portion 312 can also be detected by an enlarged image obtained by polishing the cross section and exposing the cross section.

Method of Manufacturing Multilayer Ceramic Capacitor 1
Material Sheet Preparation Step S1

Figure 5:
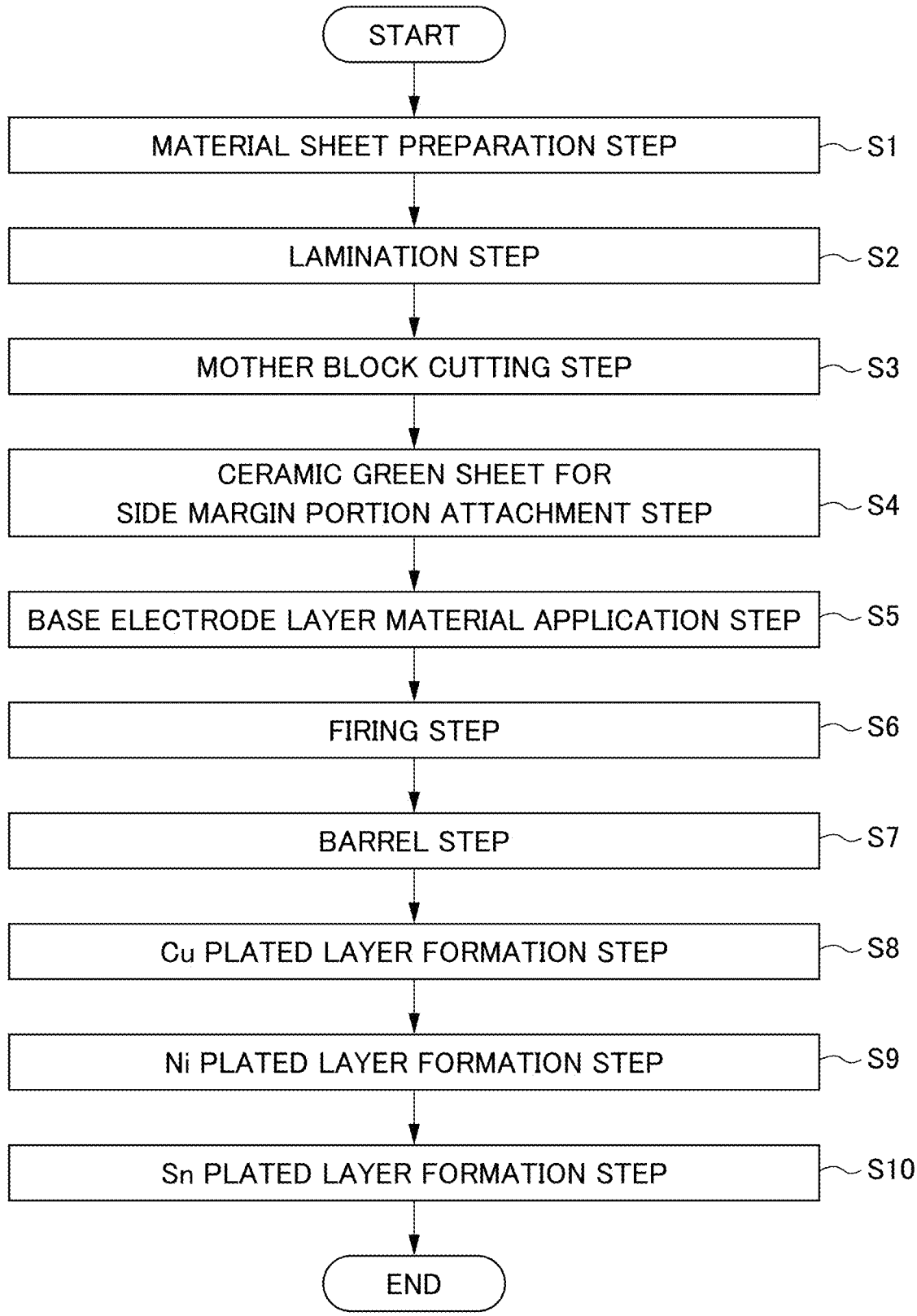
FIG. 5 is a flowchart illustrating a method of manufacturing the multilayer ceramic capacitor 1.

FIG. 5 is a flowchart illustrating a non-limiting example of a method of manufacturing the multilayer ceramic capacitor 1 according to a preferred embodiment of the present invention.

First, a ceramic slurry for an internal dielectric layer including a ceramic powder including Ba and Ti components, a binder, a solvent, and Si is prepared.

The ceramic slurry is formed into a sheet shape on a carrier film using, for example, a die coater, a gravure coater, a micro gravure coater, or the like, such that a ceramic green sheet is produced.

Subsequently, a conductor paste including Ni is printed on the ceramic green sheet by, for example, screen printing, ink jet printing, gravure printing, or the like so as to have a strip-shaped pattern, such that a conductive pattern is formed. Thus, a raw sheet in which the conductive pattern defining and functioning as the internal electrode layer 15 is printed on the surface of the ceramic green sheet for the internal dielectric layer defining and functioning as the internal dielectric layer 14 is produced.

Similarly to the ceramic slurry for the internal dielectric layer, a ceramic slurry for the outer layer portion including a ceramic powder including Ba and Ti components, a binder, a solvent, and Si is prepared. The ceramic slurry for the outer layer portion is formed into a sheet shape on a carrier film by using, for example, a die coater, a gravure coater, a micro gravure coater, or the like, such that a ceramic green sheet for the outer layer portion is produced.

Lamination Step S2

Subsequently, a plurality of material sheets are laminated. At this time, the plurality of material sheets are stacked such that the belt-shaped conductive patterns are oriented in the same or substantially the same direction and the belt-shaped conductive patterns are displaced by half pitch in the width direction W between the adjacent material sheets. Furthermore, ceramic green sheets each defining and functioning as the outer layer portion 22 are stacked on both sides of a plurality of laminated material sheets.

Mother Block Cutting Step S3

Thereafter, the plurality of laminated material sheets including the ceramic green sheets defining and functioning as the outer layer portion 22 are cut using known methods.

Ceramic Green sheet for Side Margin Portion Attachment Step S4

A ceramic slurry for the side margin portion including a ceramic powder including Ba and Ti components, a binder, a solvent, and Si is prepared. The ceramic slurry for the side margin portion is applied to the surface of the carrier film and dried to prepare a ceramic green sheet for the side margin portion. Then, the ceramic green sheet for the side margin portion is peeled off from the carrier film, opposed to the lateral surface B of the multilayer body chip 10, pressed and punched, such that the ceramic green sheet for the side margin portion is attached to the lateral surface B of the multilayer body chip 10, and the multilayer body 2 before firing is manufactured.

Base Electrode Material Application Step S5

The paste for the base electrode is applied to both end surfaces C of the multilayer body 2 on which the ceramic green sheet for the side margin portion is attached to the multilayer body chip 10.

Paste for Base Electrode

The paste for the base electrode is a conductive paste including a metal powder, which is Cu powder, glass, a resin including an Ethocel (registered trademark) resin and an acrylic resin which are at least partially copolymerized, and a solvent.

The Cu powder is a particle made of at least one of Cu and a Cu alloy.

The glass includes Si and is a frit.

The Ethocel (registered trademark) resin is, for example, at least one selected from ethyl cellulose, methyl cellulose, hydroxypropyl cellulose, trityl cellulose, acetyl cellulose, carboxymethyl cellulose, and nitro cellulose.

The acrylic resin is, for example, at least one selected from isobutyl methacrylate, methyl methacrylate, hydroxyethyl methacrylate, hydroxypropyl methacrylate, n-butyl methacrylate, and 2-ethylhexyl methacrylate.

The solvent includes, for example, at least one selected from terpineol, dihydrotarpineol, dihydrotarpineyl acetate, propylene glycol phenyl ether, benzyl alcohol, texanol, and butyl carbitol acetate.

At least a portion of the Ethocel (registered trademark) resin and the acrylic resin is copolymerized. For example, the OH group of the Ethocel (registered trademark) resin is substituted with a vinyl group, and the Ethocel (registered trademark) resin and the acrylic resin are bonded to each other through the substituted vinyl group.

The base electrode layer 31 is formed by repeating three times the steps of immersing both end surfaces C of the multilayer body 2 in the paste for the base electrode, and then pulling up and drying the paste in a preferred embodiment of the present invention.

Here, since the paste for the base electrode applied to the multilayer body 2 includes a thinner end portion than the central portion, the drying of the end portion tends to proceed. Accordingly, since the proportion of the resin in the paste for the external electrode becomes higher at the end portion than at the central portion, and becomes unstable in terms of energy, Marangoni convection occurs in which the paste for the external electrode flows from the central portion to the end portion.

The Ethocel (registered trademark) resin has rigidity and high heat storage property. Therefore, the paste for the external electrode is prevented from solidifying in the middle of flow in the drying step, thus promoting Marangoni convection. Therefore, by adjusting the amount of the Ethocel (registered trademark) resin, it is possible to adjust the strength of Marangoni convection, and it is possible to make the paste for the external electrode to have a shape in which the outer peripheral portion of the end surface C protrudes at the time of drying. The portion having a protruding shape corresponds to the outer peripheral portion 30S. Thus, by adjusting the amount of Ethocel (registered trademark) resin, it is possible to adjust the thickness L1 of the central portion 30M and the thickness L2 of the outer peripheral portion 30S to establish the relationship of L1<L2. Furthermore, it is possible to adjust the distance T1 from the outer periphery of the end surface C of the outer peripheral portion 30S by adjusting the amount of Ethocel (registered trademark) resin.

Furthermore, when the steps of immersing both end surfaces C of the multilayer body 2 in the paste for the base electrode, and then pulling up and drying them are repeated three times in a preferred embodiment of the present invention, the third portion 313 is formed in the first immersion. The immersion depth at this time is equivalent to m1+m2+m3. Next, when the second immersion is performed, the immersion depth is made shallower by m3 than the first immersion. Then, when the third immersion is performed, the immersion depth is made shallower by m2 than the second immersion. m2 is shorter than m3 and m1.

Thus, the third portion 313 having a length in the length direction L of m3, the second portion 312 having a length in the length direction L of m2, and the first portion 311 having a length in the length direction L of m1 are formed.

Then, the first portion 311 having the first thickness t1, the second portion 312 having the second thickness t2, and the third portion 313 having the third thickness t3 are sequentially arranged from the end surface C toward the central portion in the length direction L on the outer peripheral surface portion Q of the base electrode layer 31, and the relationship of t1>t2>t3 is satisfied. In the base electrode layer 31 in the outer peripheral surface portion Q, the steps are formed between the first portion 311 and the second portion 312, and between the second portion 312 and the third portion 313.

Firing Step S6

After drying, the multilayer body 2 to which the paste for the base electrode is adhered is degreased under a predetermined condition in a nitrogen atmosphere, then fired at a predetermined temperature in a mixed atmosphere of nitrogen-hydrogen-water vapor, and fired.

At this time, by adjusting the firing conditions and the amounts of Cu powder, solvent, resin, and glass included in the paste for the base electrode, the glass region 31b floats on the surface of the base electrode layer 31.

Figure 6:
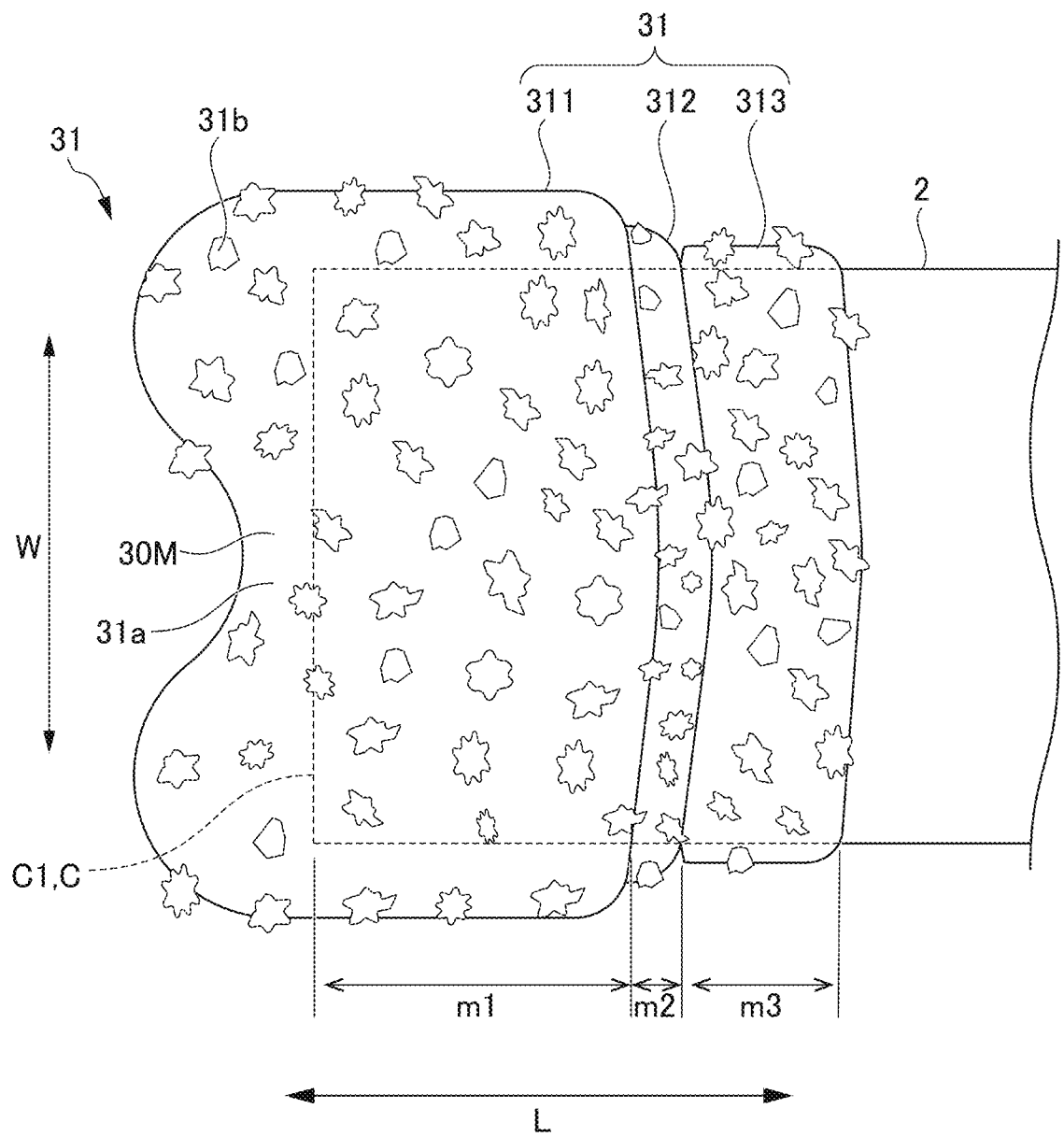
FIG. 6 is a view showing a state before barrel processing in which a base electrode layer 31 is fired on a surface of a multilayer body 2.

FIG. 6 is a view showing a state before the barrel processing in which the base electrode layer 31 is fired on the surface of the multilayer body 2. In the state shown in FIG. 6, the glass region 31b floats on the surface of the base electrode layer 31.

The glass region 31b preferably has an equivalent circle diameter of, for example, about 1 μm or less. If the thickness exceeds about 1 μm, it takes a lot of time to grow the Cu plating in the subsequent Cu plating step. When the thickness is about 0.5 μm or less, sealing properties cannot be expected.

Barrel Step S7

Figure 7:
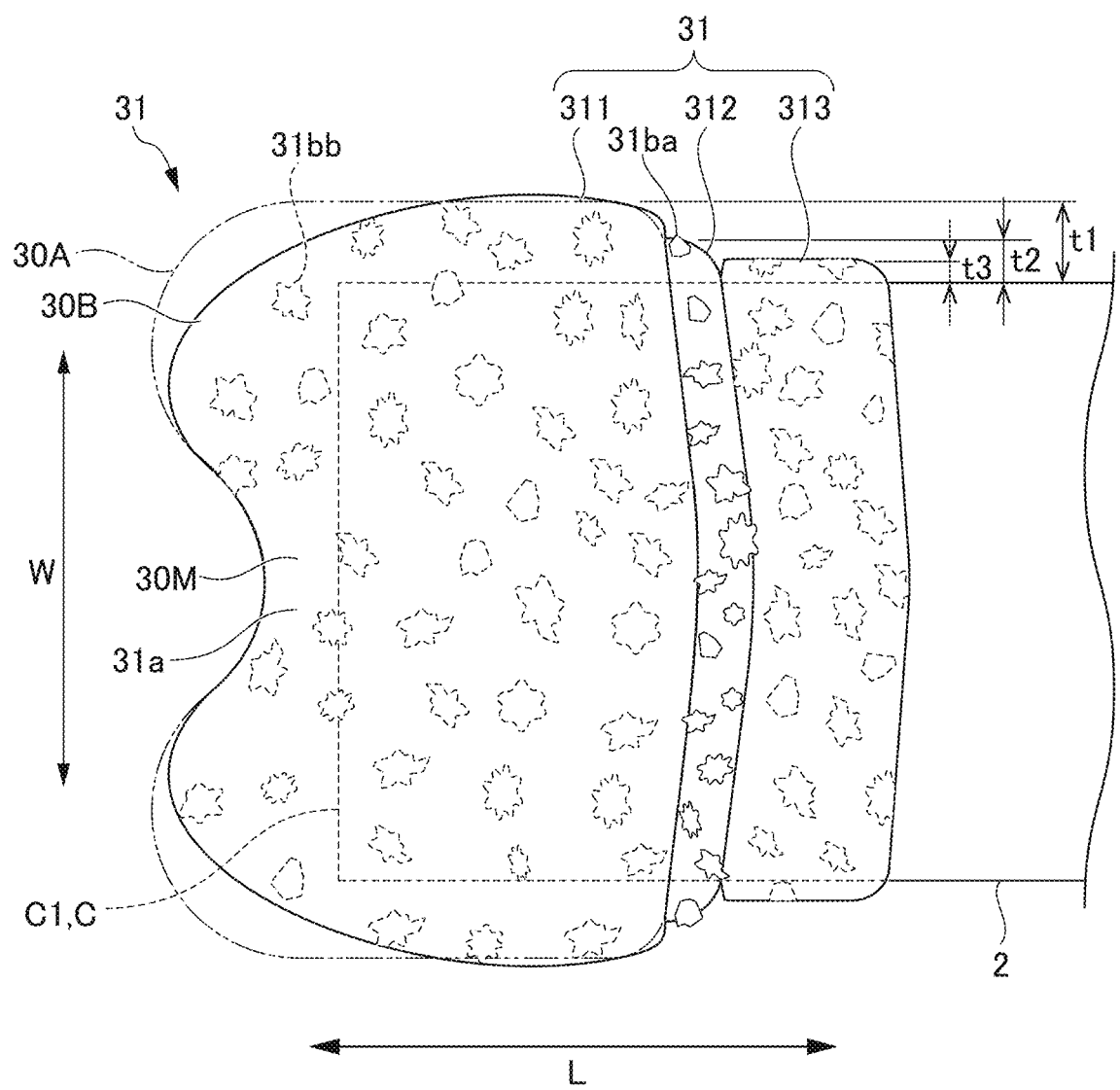
FIG. 7 is a view showing a state after the barrel processing on the multilayer body 2 shown in FIG. 6.

In the following barrel step S7, for example, barrel processing is performed in which a medium is stirred with the multilayer body 2 having the base electrode layer 31 formed thereon in a stirring tank to polish the surface of the base electrode layer 31, while causing the medium to collide with the surface of the base electrode layer 31. FIG. 7 is a view showing a state after barrel processing on the multilayer body 2 shown in FIG. 6.

When the medium collides with the surface of the base electrode layer 31, the glass region 31b protruding from the surface of the base electrode layer 31 becomes flat except for the second portion 312, the Cu region 31a is extended, and the surface of the base electrode layer 31 becomes smooth. The glass region 31b denoted by reference numeral 31bb in FIG. 7 is a flat glass region 31bb which is formed by polishing the glass region 31b by the medium, although, before the barrel step S7, the glass region 31b protrudes from the surface of the base electrode layer 31.

In FIG. 7, a dotted line 30A represents the outline of the base electrode layer 31 in FIG. 6. A solid line 30B represents the outline of the base electrode layer 31 after the barrel processing. As shown, when the barrel processing is performed, the outer peripheral portion of the base electrode layer 31 is polished by the medium. However, in a preferred embodiment of the present invention, in the state before the barrel processing shown in FIG. 6, the outer peripheral portion of the end surface C of the base electrode layer 31A has a protruding shape. In the barrel step S7, in particular, the outer peripheral portion of the end surface C of the base electrode layer 31 is easily cut, but since the outer peripheral portion protrudes, the possibility that the base electrode layer 31 is entirely cut is low, and the multilayer body 2 is not exposed.

The length m2 of the second portion 312 is shorter than that of the first portion 311 and the third portion 313, and is surrounded by the step between the first portion 311 and the third portion 313. Therefore, the surface of the second portion 312 is less likely to collide with the medium, and the glass region 31b protruding from the surface in the second portion 312 is maintained in a state of protruding from the surface. The glass region 31b denoted by the reference numeral 31ba in FIG. 7 is a glass region 31ba in which a state protruding from the surface of the base electrode layer 31 is maintained even after the barrel step S7. As described above, on the surface of the second portion 312, a large amount of the glass region 31ba which is maintained in a state protruding from the surface remains and, therefore, the hardness of the surface is kept high, and the bending strength of the multilayer ceramic capacitor 1 is increased.

Cu-plated Layer Formation Step S8

Next, the Cu-plated layer 321 is formed on the base electrode layer 31. The glass region 31b exposed on the surface of the base electrode layer 31 includes Si at a density equal or substantially equal to that of the glass region 31b included in the base electrode layer 31 before performing the Cu plating regardless of whether the glass region 31b is the glass region 31bb made flat in the barrel step S7 or the glass region 31ba kept protruding from the surface similarly to the second portion 312 of the outer peripheral surface portion Q.

However, in the Cu-plated layer formation step S8, a portion of the plating solution erodes the glass regions 31ba and 31bb on the surface of the base electrode layer 31.

For this reason, the density of the glass, i.e., Si, included in the glass region 31ba and the glass region 31bb on the surface of the base electrode layer 31 decreases, and a plurality of cavities are generated to form a Si low density glass region. When Cu included in the Cu plating solution enters the cavities, the Si low density glass region becomes the Cu-including glass region 31c.

As described above, Cu included in the Cu plating solution enters the glass region 31ba and the glass region 31bb in the Si low density glass region, such that the adhesion strength between the base electrode layer 31 and the Cu-plated layer 321 is improved. Therefore, it is possible for the Cu-plated layer 321 to completely cover the base electrode layer 31 without any gap, such that it is possible to obtain high sealing properties.

Furthermore, the glass region 31ba on the surface of the second portion 312 is difficult to be polished even in the barrel step S7, and is kept protruding from the Cu region. Therefore, since the Cu-plated layer 321 penetrates into the Cu-plated layer 321, adhesion to the Cu-plated layer 321 is improved.

Ni-plated Layer Formation Step S9

Next, the Ni-plated layer 322 is formed outside the Cu-plated layer 321 to cover the surface of the Cu-plated layer 321. It is possible for the Ni-plated layer 322 to prevent the base electrode layer 31 and the Cu-plated layer 321 from being eroded by solder when the multilayer ceramic capacitor 1 is mounted.

Sn-plated Layer Formation Step S10

The Sn-plated layer 323 is formed outside the Ni-plated layer 322 to cover the surface of the Ni-plated layer 322. The Sn-plated layer 323 improves wettability of solder when mounting the multilayer ceramic capacitor, and allows for easy mounting.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including a plurality of internal electrode layers and a plurality of internal dielectric layers alternately laminated therein, main surfaces on both sides in a lamination direction, end surfaces on both sides in a length direction intersecting the lamination direction, and lateral surfaces on both sides in a width direction intersecting the lamination direction and the length direction; and
   two external electrodes on the end surfaces of the multilayer body; wherein
   the two external electrodes each include:
      a central portion having a thickness L1, the central portion being located at a center or approximate center in the lamination direction and at a center or approximate center in the width direction; and
      an outer peripheral portion surrounding the central portion and having a thickness L2, where a relationship therebetween is L1<L2;
   each of the two external electrodes includes a base electrode layer on the multilayer body;
   each of the base electrode layers includes glass;
   each of the base electrode layers includes an outer peripheral surface portion on each of the main surfaces and the lateral surfaces;
   each of the outer peripheral surface portions of the base electrode layers includes a first portion, a second portion, and a third portion in this order from end surface portions of the base electrode layers;
   steps are respectively provided between the first portion and the second portion, and between the second portion and the third portion; and
   the second portion includes a larger amount of glass protruding from the base electrode layers than each of the first portion and the third portion.

2. The multilayer ceramic capacitor according to claim 1, wherein the outer peripheral portion is a rectangular or substantially rectangular region surrounding the central portion on an inner side of the end surface from an outer periphery thereof by about 5 μm or more and about 20 μm or less.

3. The multilayer ceramic capacitor according to claim 1, wherein the outer peripheral portion is a rectangular or substantially rectangular region surrounding the central portion on an inner side of the end surface from an outer periphery thereof by about 15 um.

4. The multilayer ceramic capacitor according to claim 1, wherein
   the thickness L1 is about 3 μm or more and about 15 μm or less; and
   the thickness L2 is about 5 μm or more and about 20 μm or less.

5. The multilayer ceramic capacitor according to claim 1, wherein
   a positional displacement between end portions, which are located adjacent to one of the lateral surfaces, of two neighboring internal electrode layers of the plurality of internal electrode layer in the lamination direction is about 5 μm or less; and
   a distance from the end portion of one of the two neighboring internal electrode layers in the width direction to one of the lateral surfaces of the multilayer body is about 5 μm or more and about 20 μm or less.

6. The multilayer ceramic capacitor according to claim 1, wherein the outer peripheral portion having the thickness L2 is a thickest portion of the external electrode, and is located closer to a center or approximate center in the lamination direction than an internal electrode layer of the plurality of internal electrode layers closest to one of the main surfaces.

7. The multilayer ceramic capacitor according to claim 1, wherein each of the plurality of internal electrode layers includes Ni as a main component.

8. The multilayer ceramic capacitor according to claim 7, wherein each of the plurality of internal electrode layers further includes dielectric particles.

9. The multilayer ceramic capacitor according to claim 1, wherein a positional displacement between end portions of adjacent internal electrode layers of the plurality of internal electrode layers is about 0.5 μm or less.

10. The multilayer ceramic capacitor according to claim 1, wherein a number of the plurality of internal electrode layers is 10 or more and 1000 or less.

11. The multilayer ceramic capacitor according to claim 1, wherein a thickness of each of the plurality of internal electrode layers is about 0.3 μm or more and about 0.4 μm or less.

12. The multilayer ceramic capacitor according to claim 1, wherein each of the plurality of internal dielectric layers includes Ba and Ti components and Si.

13. The multilayer ceramic capacitor according to claim 1, wherein a number of the plurality of internal dielectric layers is 100 or more and 2000 or less.

14. The multilayer ceramic capacitor according to claim 1, wherein a thickness of each of the plurality of internal dielectric layers is about 0.4 µm or more and about 0.5 µm or less.

15. The multilayer ceramic capacitor according to claim 1, wherein each of the two external electrodes include the base electrode layer and a plated layer on the base electrode layer.

16. The multilayer ceramic capacitor according to claim 15, wherein the plated layer includes a Cu plated layer on the base electrode layer, a Ni plated layer on the Cu plated layer, and a Sn plated layer on the Ni plated layer.

17. The multilayer ceramic capacitor according to claim 16, wherein
the Cu plated layer, the Ni plated layer, and the Sn plated layer each include an end surface portion and an outer peripheral surface; and
the end surface portion of each of the base electrode layer, the Cu plated layer, the Ni plated layer, and the Sn plated layer is on one of the end surfaces, and the outer peripheral surface portion of each of the base electrode layer, the Cu plated layer, the Ni plated layer, and the Sn plated layer is on each of the main surfaces and the lateral surfaces.

18. The multilayer ceramic capacitor according to claim 17, wherein the outer peripheral surface portion of the base electrode layer includes the first portion having a first thickness t1, the second portion having a second thickness t2, and the third portion having a third thickness t3 in this order from the end surface portion of the base electrode layer, and a relationship of t1>t2 >t3 is satisfied.

19. The multilayer ceramic capacitor according to claim 18, wherein a length of the first portion in the length direction is defined as m1, a length of the second portion in the length direction is defined as m2, a length of the third portion in the length direction is defined as m3, and m2 is shorter than m3 and m1.

20. The multilayer ceramic capacitor according to claim 18, wherein a length of the first portion in the width direction is equal to or greater than about 1.01 times a length of the second portion in the width direction.

* * * * *